F. FAIRBANKS.
Drop-Lever Weighing-Scale.
No. 208,300. Patented Sept. 24, 1878.
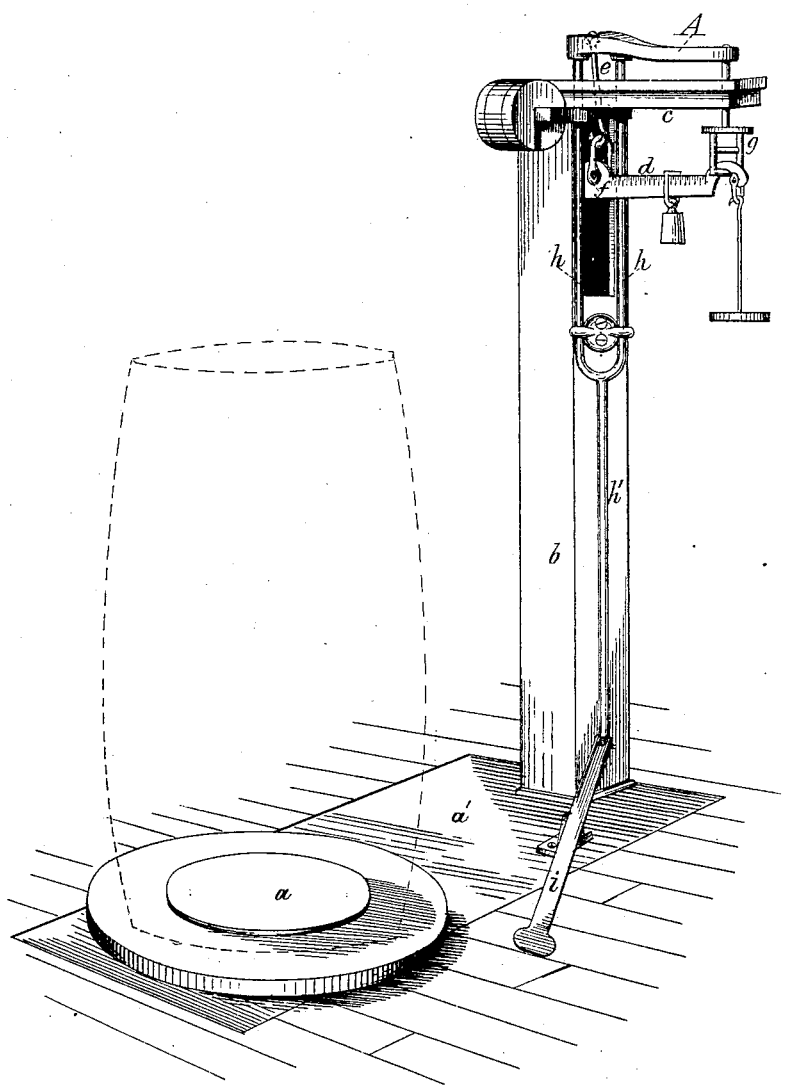
Attest:
Chas. M. Higgins.
W. H. C. Smith.
Inventor:
Franklin Fairbanks
by his Attorneys.
S. H. Wales & Son

UNITED STATES PATENT OFFICE.

FRANKLIN FAIRBANKS, OF ST. JOHNSBURY, VERMONT, ASSIGNOR TO E. & T. FAIRBANKS & CO., OF SAME PLACE.

IMPROVEMENT IN DROP-LEVER WEIGHING-SCALES.

Specification forming part of Letters Patent No. 208,300, dated September 24, 1878; application filed August 10, 1878.

*To all whom it may concern:*

Be it known that I, FRANKLIN FAIRBANKS, of St. Johnsbury, Caledonia county, Vermont, assignor to E. & T. FAIRBANKS & Co., of same place, have invented certain new and useful Improvements in Drop-Lever Scales, of which the following is a specification:

My invention applies to that class of platform-scales known as "drop-lever" scales, in which the graduated beam, with its connections, is dropped or raised by a hand or foot lever to throw the weighing apparatus out of or into action, as occasion requires.

The object of my invention is to provide a raising and dropping mechanism which shall raise and drop the scale-beam bodily or uniformly from each end, so as to prevent any injurious movement or wear of the beam at either of its points of support; and to this end my invention may be stated to consist in connecting the cap-loop, in which the weighted end of the beam is received, with the fulcrum-loop by means of a horizontal rigid connecting-arm, arranged parallel with the beam, and from the opposite ends of which both the fulcrum-loop and the cap-loop are suspended, so that when this arm is raised or dropped by the movement of the operating-lever to raise or lower the beam and its connections, both points of support move simultaneously with the beam, which moves bodily with its supports, thereby wholly preventing the independent movement of the bearing-points of the beam, and thus obviating injurious wear.

The annexed drawing presents a perspective view of a flour-packing scale provided with my improved lever dropping and raising mechanism, which is shown elevated to a medium position.

In the drawing, $a$ $a'$ indicate the platform; $b$, the pillar rising therefrom; $c$, the cap surmounting the pillar and extending laterally from it. $d$ is the graduated beam of the scale, to which the weight of the platform is transmitted by a rod which descends the pillar to connect with the platform-lever. $f$ is the fulcrum-loop, in which the points or knife-edges of the beam are suspended, and $g$ is the cap-loop, in which the opposite or crooked and weighted end of the beam is received.

Now, A is a rigid horizontal arm, arranged above the cap of the scale and disposed parallel with the beam, the cap-loop $g$ being fixed to and suspended from one end thereof, while the fulcrum-loop $f$ is suspended from its opposite end by a hooked rod, $e$. This arm is firmly fixed, at the fulcrum end of the beam, on the top of two upright rods, $h$ $h$, which are suitably held and guided in bearings on the side of the pillar, and are connected at their lower end with a foot-lever, $i$, by the depression of which the beam may be raised to bring the scale into action, while the release of the lever permits the beam to drop by its own weight to throw the scale out of action.

The upright rods and foot-lever are of the usual construction heretofore employed; but they have been heretofore simply joined at the top by a short cross-bar, from which the fulcrum-loop is suspended, while the cap-loop has been fixed rigidly to the cap of the scale, and no connection provided between the cap-loop and the rods $h$.

It will now be observed that both ends of the scale-beam are suspended from the connecting-arm A, which forms a fixed part of the lifting and dropping device, so that when this arm is raised or dropped by the action of its operating-lever each end of the beam moves simultaneously, the points of support at each end of the beam moving bodily with the beam itself, and thus preventing the possibility of any independent movement of either end of the beam on its points of support, and thereby fully accomplishing the object of the invention.

The arm A may be operated either by a foot or hand lever. In flour-packing scales, for which the invention is chiefly designed, a foot-lever is usually employed, about on a level with the platform, as shown in the drawing, while in a more general class of scales a hand-lever may be employed, arranged in about the usual manner above the cap of the scale, and suitably connected with the arm A by a cam or crank to raise or lower the same. The guide-rods $h$ $h$, or an equivalent thereof, are employed in either case to give a long and firm bearing to the arm A, to properly guide it in its movements.

What I claim is—

In a drop-lever scale, a raising and dropping mechanism constructed with a horizontal arm, A, capable of a rising and falling movement, and actuated by a suitable operating-lever, the said arm being disposed parallel with the scale-beam, and having the fulcrum-loop and cap-loop of the beam, which form its points of support, suspended from the opposite ends of the said arm, by which the beam, with its points of support, is raised or dropped bodily, and injurious movement or wear of the bearing-point thus prevented, substantially as herein set forth.

FRANKLIN FAIRBANKS.

Witnesses:
E. D. BLODGETT,
D. DEAN PATTERSON.